United States Patent
Britton

(12)
(10) Patent No.: US 6,694,966 B1
(45) Date of Patent: Feb. 24, 2004

(54) METHOD OF HEATING A LIQUID OR FOOD

(76) Inventor: Dan Britton, 6836 - 410th St., North Branch, MN (US) 55056

( * ) Notice: Subject to any disclaimer, the term of this patent is extended or adjusted under 35 U.S.C. 154(b) by 88 days.

(21) Appl. No.: 10/133,873

(22) Filed: Apr. 26, 2002

(51) Int. Cl.[7] ................................ F24B 3/00; F24C 5/00
(52) U.S. Cl. ............................................ 126/30; 126/50
(58) Field of Search ..................... 126/30, 50, 215; 248/311.2, 312.1; 211/74

(56) References Cited

U.S. PATENT DOCUMENTS

| | | | |
|---|---|---|---|
| 2,128,466 A | | 8/1938 | Machotka |
| 2,424,094 A | | 7/1947 | Herr |
| 2,515,523 A | * | 7/1950 | Mancino ................. 248/312.1 |
| 2,639,502 A | | 5/1953 | Wormelle, Jr. |
| 2,665,936 A | | 1/1954 | Moore |
| 2,786,707 A | | 3/1957 | Campbell |
| 2,806,732 A | | 9/1957 | Montanaro |
| 3,189,937 A | | 6/1965 | Sciortino |
| D232,614 S | | 9/1974 | Brown |
| 3,874,623 A | * | 4/1975 | Moulton .................... 248/121 |
| 4,127,915 A | | 12/1978 | Logan et al. |
| D251,175 S | | 2/1979 | Logan et al. |
| D265,278 S | | 7/1982 | Mellgren |
| D265,279 S | | 7/1982 | Wright |
| 4,602,723 A | | 7/1986 | DeMars |
| D303,336 S | | 9/1989 | Webster |
| D307,372 S | | 4/1990 | Ayslworth |
| 4,993,767 A | | 2/1991 | Song |
| D330,858 S | | 11/1992 | Harris |
| 5,203,471 A | | 4/1993 | Widman |
| 5,505,330 A | | 4/1996 | Nunes |
| D372,844 S | | 8/1996 | Nunes |
| 5,584,520 A | | 12/1996 | Niemeier |
| 5,597,190 A | | 1/1997 | DeMars |
| D384,557 S | | 10/1997 | Goza |
| 5,683,009 A | | 11/1997 | King |
| 5,848,584 A | * | 12/1998 | Brog .......................... 126/30 |
| 6,102,458 A | | 8/2000 | Scace |
| 6,264,153 B1 | | 7/2001 | Ragner et al. |
| 6,266,849 B1 | | 7/2001 | Petit et al. |
| D448,995 S | | 10/2001 | McDonald |

* cited by examiner

*Primary Examiner*—Alfred Basichas
(74) *Attorney, Agent, or Firm*—Sherrill Law Offices, PLLC; Elizabeth D. Lewen

(57) ABSTRACT

A method for heating a liquid or food. The method includes the steps of (1) obtaining a tool including an interconnected combination of a clip, a handle, and a hook; (2) inserting a vessel capable of holding a liquid within the clip; (3) placing a liquid within the vessel; and (4) heating the liquid.

7 Claims, 8 Drawing Sheets

METHOD OF HEATING A LIQUID OR FOOD

FIELD OF INVENTION

The invention relates to a method for heating a liquid or food.

BACKGROUND

Many people participate in outdoor activities such as hunting, fishing, and camping. But as most people do not participate in these activities in their backyards, the equipment and provisions needed to participate must be transported to the place where the activity will commence. The amount of equipment can depend on the number of people participating, the length of time anticipated to participate, or the place of the activity.

Ice fishing is an activity that can pose challenges of space to the participant. Ice fishing is most often done on lakes and rivers in icehouses. The icehouses are typically modestly sized and capable of holding only limited equipment and provisions. As a typical ice fisher stays on the ice for long stretches of time, food, beverages, and heaters are often needed, as well as, the fishing equipment. Transporting and storing all of the equipment and provisions can be quite difficult and challenging to an ice fisher with limited time and a modest icehouse. The ice fisher must often be selective about the equipment and provisions utilized in the activity. Having to leave desired equipment or provisions at home could greatly reduce the enjoyment of the activity to the ice fisher.

To increase enjoyment of the activity, a need exists for equipment and provisions that take up less space in transport and storage. One solution is to use dual-purpose equipment. If one compact item by itself or coupled with another needed item can serve more than one purpose, then less equipment and provisions are needed and less space is needed. One piece of single use equipment used by an ice fisher is a slotted spoon type devise. An ice fisher needs to keep the ice hole open during fishing. Most ice fishers use the slotted spoon type device to strain and remove the slushy ice mixture from the hole. This process takes time and requires the ice fisher to find a space within or near the icehouse to deposit the removed slushy ice mixture. The slotted spoon device has no other use to the ice fisher other than removing the slushy mixture from the hole.

Accordingly, a need exists for a dual use tool that can be used to quickly and efficiently keep an ice hole open.

SUMMARY OF THE INVENTION

The invention is directed to a method of heating a liquid or food.

The first embodiment of the invention involves obtaining a tool. The tool includes at least an interconnected combination of at least a clip, a handle, and a hook. The clip includes at least a longitudinally extending central section, a first connection member extending in a first transverse direction from the central section, and a second connection member longitudinally spaced from the first connection member and extending in the first transverse direction from the central section. The handle extends longitudinally relative to the clip in a first longitudinal direction. The hook extends in a second transverse direction and a second longitudinal direction relative to the clip and is longitudinally positioned intermediate the first and second connection members. A vessel, capable of holding a liquid, is inserted within the clip. A liquid is placed within the vessel. The liquid is then heated.

The second embodiment of the invention involves obtaining a tool. The tool includes at least an interconnected combination of at least a clip, a handle, and a hook. The clip includes at least a longitudinally extending central section, a first connection member extending in a first transverse direction from the central section, and a second connection member longitudinally spaced from the first connection member and extending in the first transverse direction from the central section. The handle extends longitudinally relative to the clip in a first longitudinal direction. The hook extends in a second transverse direction and a second longitudinal direction relative to the clip and is longitudinally positioned intermediate the first and second connection members. An open metal food container is inserted within the clip wherein the metal food container contains a food. The food is then heated.

A third embodiment of the invention involves obtaining a tool. The tool includes at least an interconnected combination of at least a container, a handle, and a hook. The container includes at least an edge extending in a first transverse direction, a solid member extending in a first transverse direction and longitudinally spaced from the edge, and a side member having a proximal end fixedly attached to the edge and a distal end fixedly attached to the solid member. The handle extends longitudinally relative to the container in a first longitudinal direction. The hook extends in a second transverse direction and a second longitudinal direction relative to the container and is longitudinally positioned intermediate the edge and the solid member. Liquid is placed within the container. The liquid is then heated.

DETAILED DESCRIPTION OF THE INVENTION

Including a Best Mode

Nomenclature
10 Tool
20 Clip
21 Longitudinally Extending Central Section
22 First Connection Member
23 Second Connection Member 24 Leaf Spring
30 Handle
40 Hook
110 Tool
130 Handle
140 Hook
150 Container
151 Edge
152 Solid Member
153 Side Member
153a Proximal End of Side Member
153b Distal End of Side Member
200 Liquid
300 Source of Heat
400 Open metal food container
500 Food
600 Vessel Definitions As utilized herein, including the claims, a "source of heat" includes, but is not limited to, fire, gas heater, oil heater, propane heater, kerosene heater, barbecue grill, gas stove, propane stove, and charcoal grill.

Composition

The tool 10 and 110 is capable of holding a liquid 200 or food 500 to be heated. The tool 10 and 110 may be manufactured from a variety of materials, such as metal, plastic, or a combination of metal and plastic, capable of withstanding temperatures to which the tool 10 and 110 would be exposed.

Figure 1:
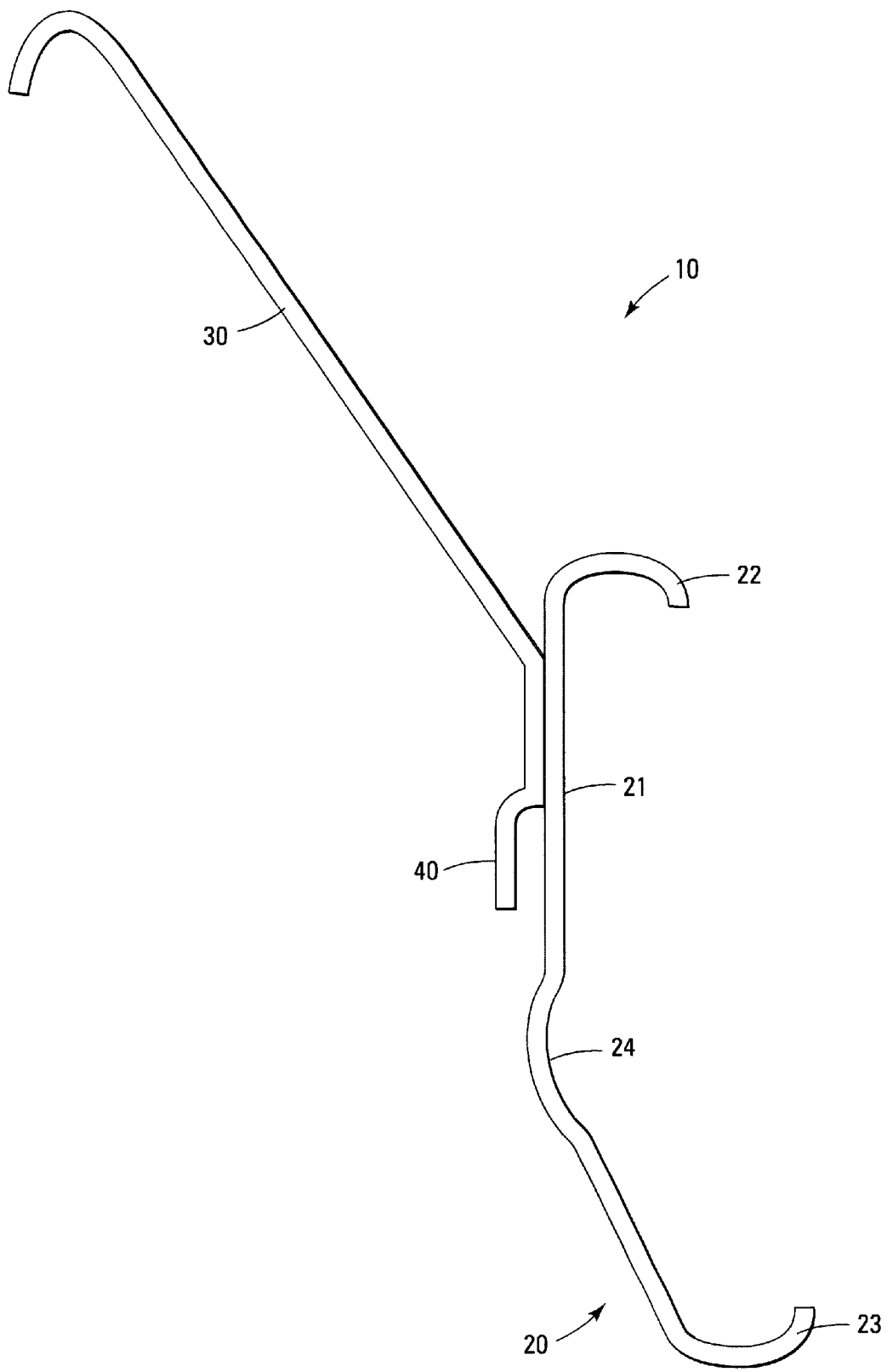
FIG. 1 is a side view of one embodiment of the invention.

As shown in FIGS. 1–2, and 5–8, a first aspect of the tool 10 includes at least an interconnected combination of at least a clip 20, a handle 30, and a hook 40. The clip 20 includes at least a longitudinally extending central section 21, a first connection member 22 extending in a first transverse direction (not numbered) from the central section 21, and a second connection member 23 longitudinally spaced from the first connection member 22 and extending in the first transverse direction (not numbered) from the central section 21. The handle 30 extends longitudinally relative to the clip 20 in a first longitudinal direction (not numbered). The hook 40 extends in a second transverse direction (not numbered) and a second longitudinal direction (not numbered) relative to the clip 20 and longitudinally positioned intermediate the first connection member 22 and the second connection member 23. The clip 20, handle 30, and hook 40 can be interconnected in a variety of ways, such as welding, fastening, or forming from a single mass of material. The preferred way to interconnect the clip 20, handle 30, and hook 40 would be a combination of welding and forming from a single mass of material as shown in FIG. 1. In FIG. 1 the handle 30 and hook 40 are formed from a single mass of material and then welded to the clip 20.

In the manufacture of the tool 10 as shown in FIGS. 1–2, and 5–8 the longitudinal space (not numbered) between the first connection member 22 and the second connection member 23 should be sufficient to allow insertion of the desired vessel 600. In the preferred embodiment the longitudinal space (not numbered) between the first connection member 22 and the second connection member 23 should approximate the height of a standard aluminum soda can (not shown).

Figure 7:
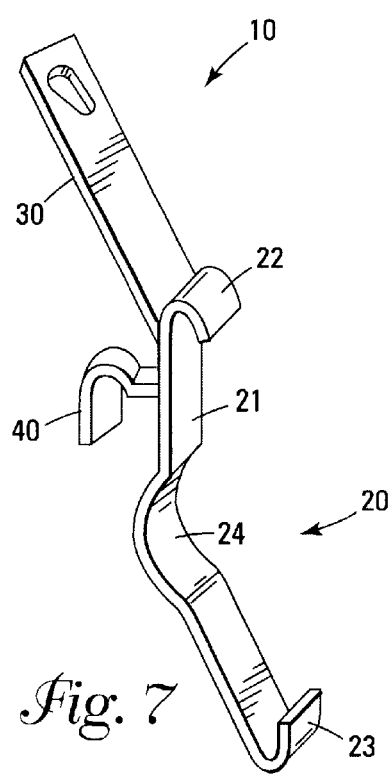
FIG. 7 is a perspective view of one embodiment of the invention.
Figure 8:
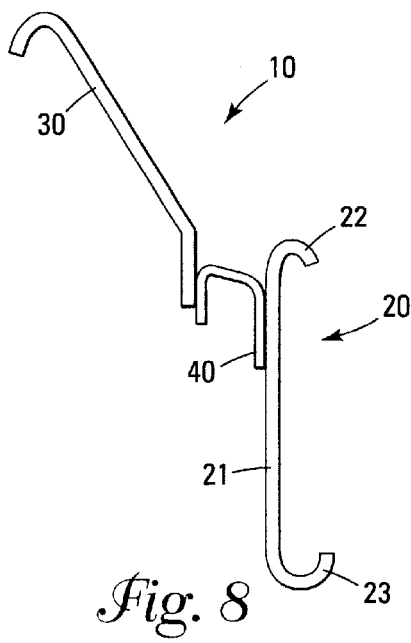
FIG. 8 is a side view of one embodiment of the invention.

As shown in FIGS. 5–8, the clip 20, handle 30, and hook 40 may be manufactured and interconnected in a variety of ways. For example, in FIG. 6 the hook 40 is attached to the handle 30 and the handle 30 attached to the clip 20. In FIG. 7 the handle 30 is attached to the clip 20 and the hook 40 attached to the clip 20.

Figure 2:
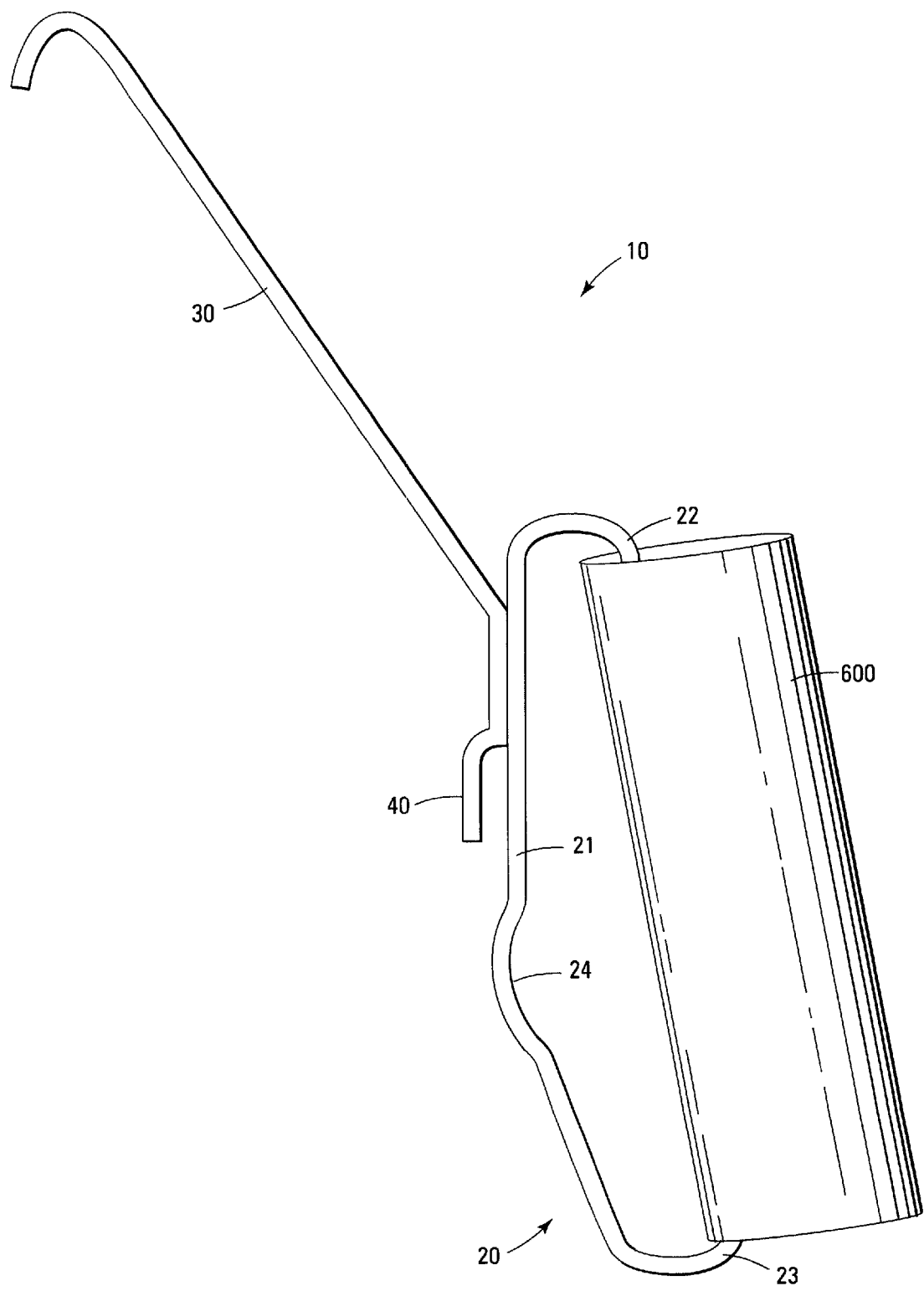
FIG. 2 is a side view of one embodiment of the invention with a vessel inserted within the clip.

As shown in FIGS. 1–2 and 7, the clip 20 may also include a leaf spring 24 intermediate the first connection member 22 and the second connection member 23. The leaf spring 24 facilitates easier insertion of a vessel 600 or open food metal container 400 into the clip 20 by temporarily increasing the longitudinal space between the first connection member 22 and the second connection member 23 when a force is applied to the leaf spring 24.

Figure 3:
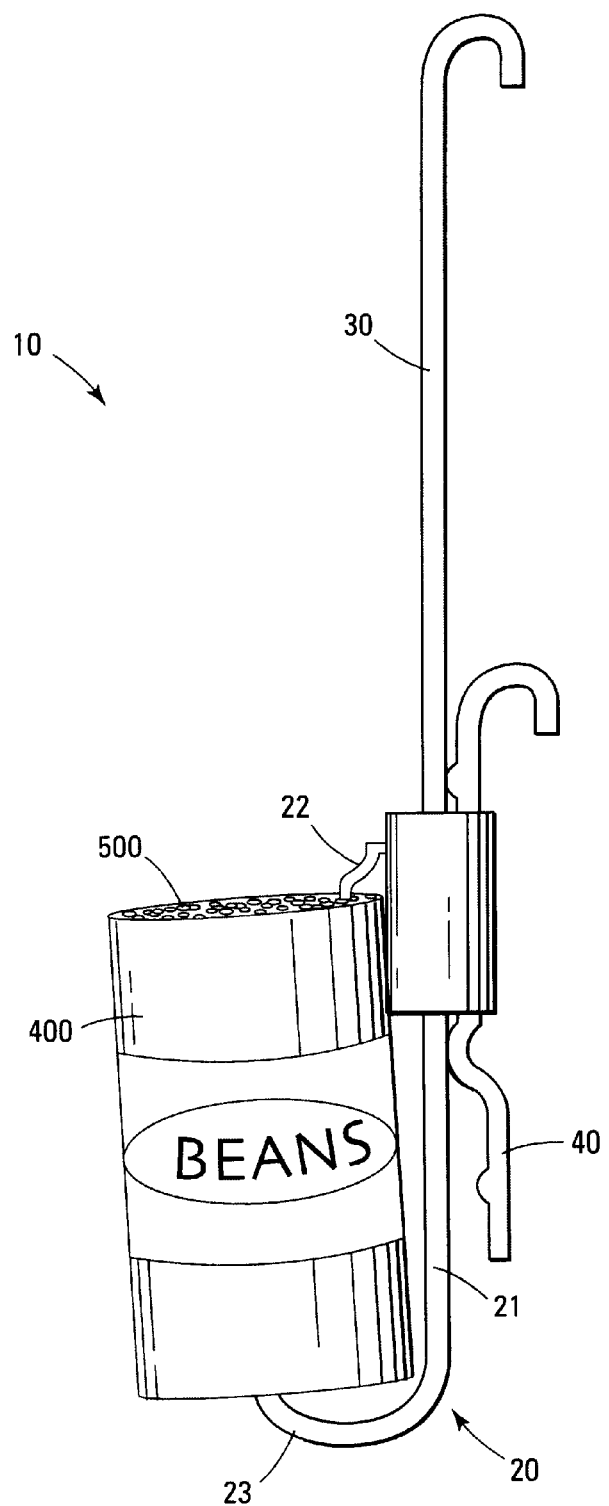
FIG. 3 a side view of one embodiment of the invention with a container containing food inserted within the clip.

A moveable first connection member 22 or second connection member 23 may also be used to provide easier insertion of a vessel 600 or open food container 400 into the clip 20. As shown in FIG. 3, the first connection member 22 may be connected to the clip 20 by way of a movable fastener (not numbered) such that the longitudinal space between the first connection member 22 and the second connection member 23 may be varied to accommodate vessels 600 or open metal food containers 400 of varying sizes into the clip 20.

As shown in FIGS. 2 and 3, when a vessel 600 or open metal food container 400 is inserted into the clip 20 the first connection member 22 engages the top edge (not numbered) of the vessel 600 or open metal food container 400 and the second connection member 23 engages the bottom edge (not numbered) of the vessel 600 or open metal food container 400.

Figure 9:
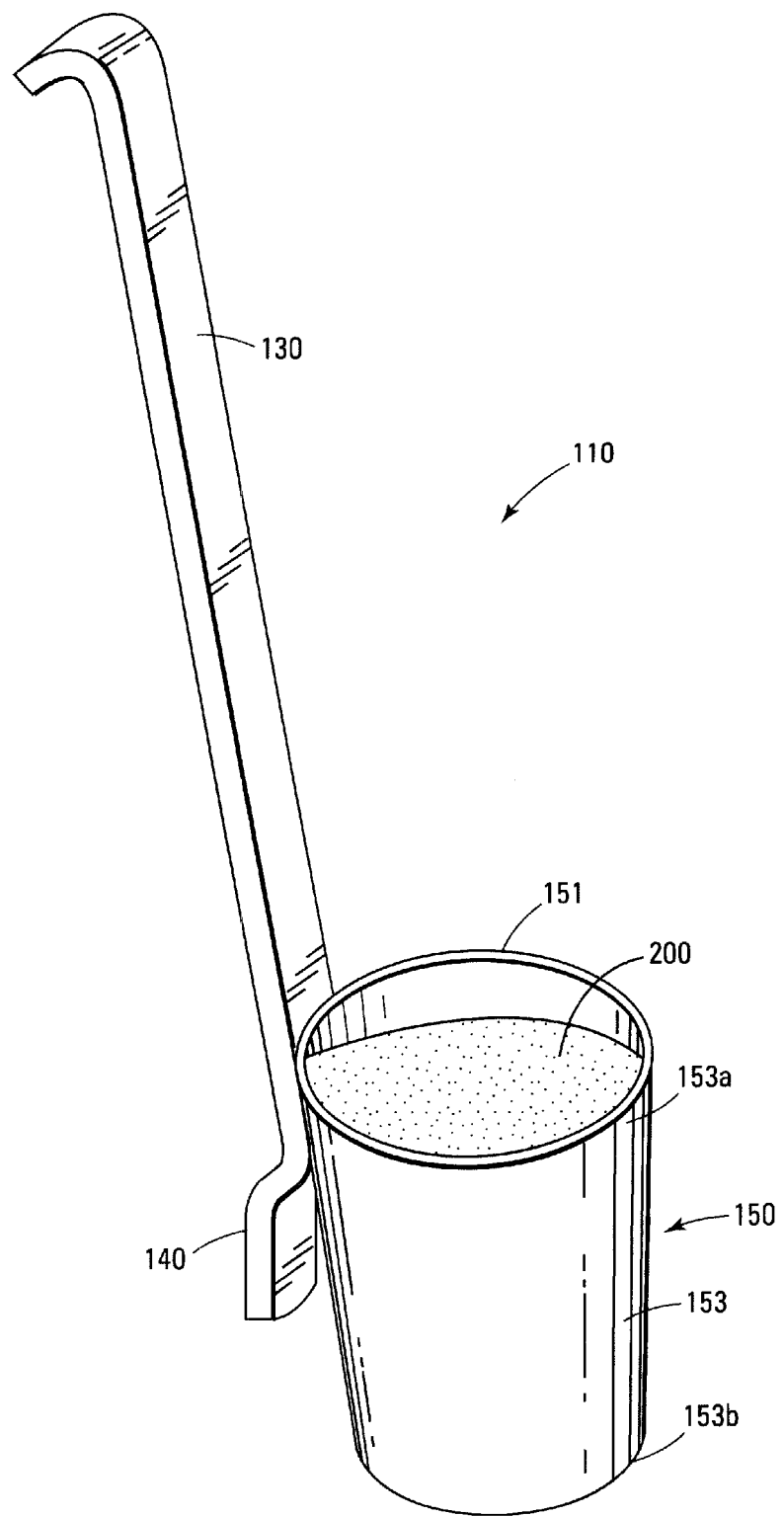
FIG. 9 is a perspective view of one embodiment of the invention.
Figure 10:
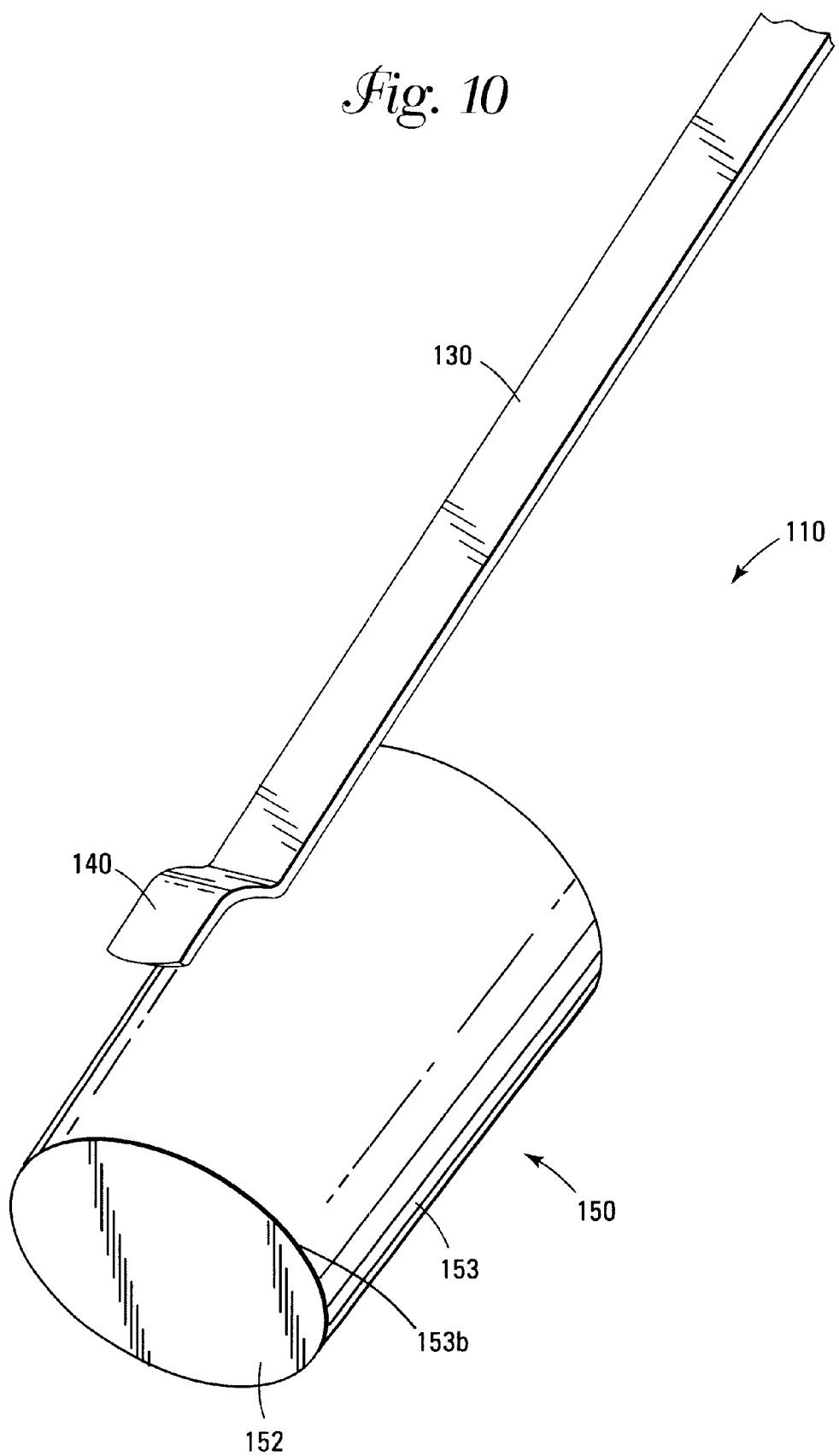
FIG. 10 is a partial perspective view of the invention in FIG. 9.
Figure 11:
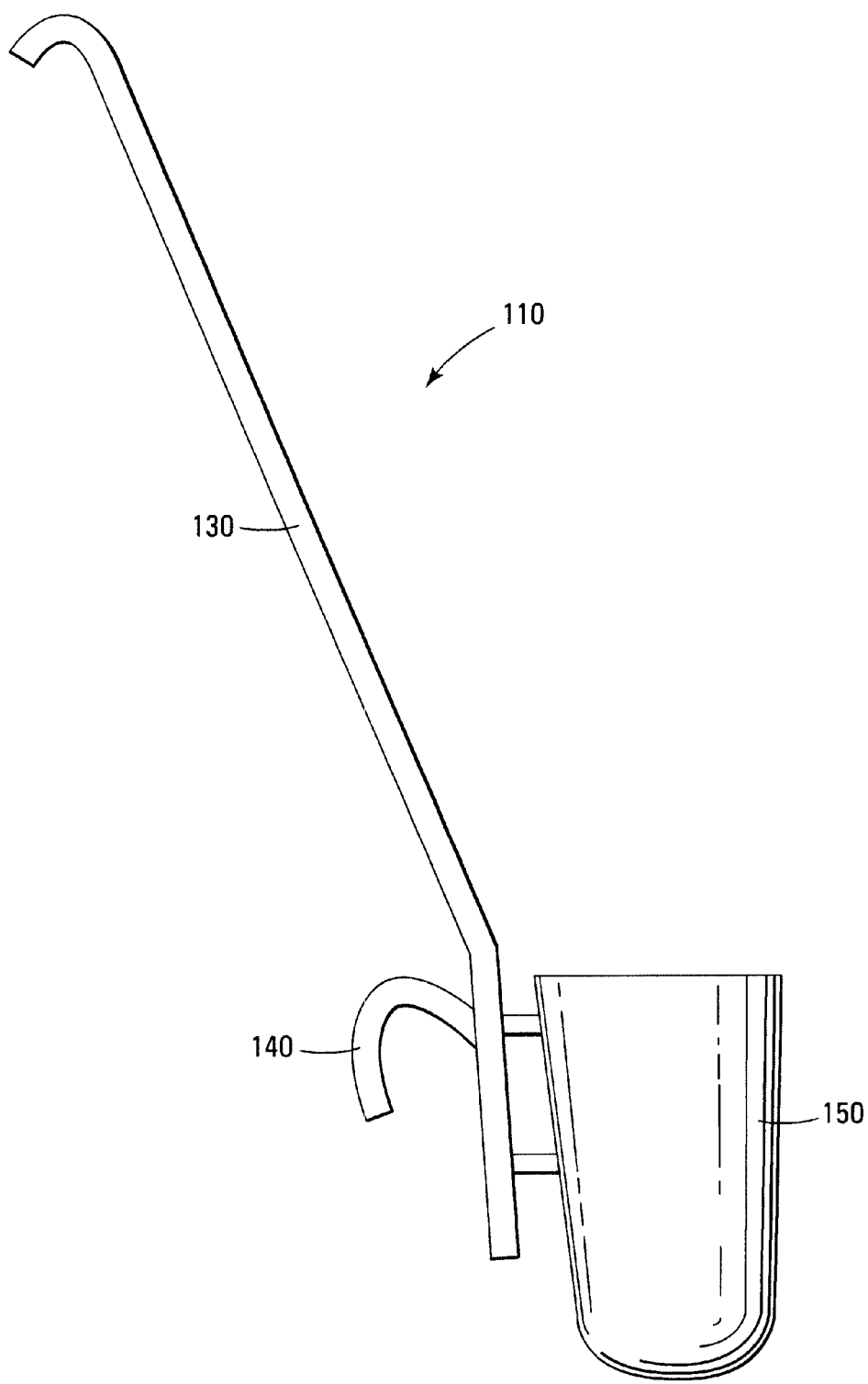
FIG. 11 is a side view of one embodiment of the invention.

As shown in FIG. 9, a second aspect of the tool 110 includes at least an interconnected combination of at least a container 150, a handle 130, and a hook 140. The container 150 includes at least an edge 151, a side member 153, and a solid member 152. The edge 151 extends in a first transverse direction (not numbered). As shown in Figure 10, the solid member 152 extends in a first transverse direction (not numbered) and is longitudinally spaced from the edge 151. The side member 153 has a proximal end 153a fixedly attached to the edge 151 and a distal end 153b fixedly attached to the solid member 152.

In both aspects of the tool 10 and 110, the handle 30 and 130 provides a means for the user (not shown) to carry and move the tool 10 and 110. The length (not numbered) of the handle 30 and 130 may vary but should be at least a length (not numbered) that will arrange and configure a portion of the handle 30 and 130 away from the source of heat 300, such that the tool 10 and 110 may be safely carried and moved by the user (not shown).

Method Process

The tool 10 and 110 is used to hold a liquid 200 or food 500 while heating the liquid 200 or food 500. In the first embodiment a vessel 600 capable of holding a liquid 200 is inserted into the clip 20 of the tool 10. To insert the vessel 600 the user (not shown) engages the top edge (not numbered) of the vessel 600 with the first connection member 22. The bottom edge (not numbered) of the vessel 600 engages the second connection member 23. Engagement of both ends (not numbered) of the vessel 600 should maintain the vessel 600 within the clip 20.

Figure 4:
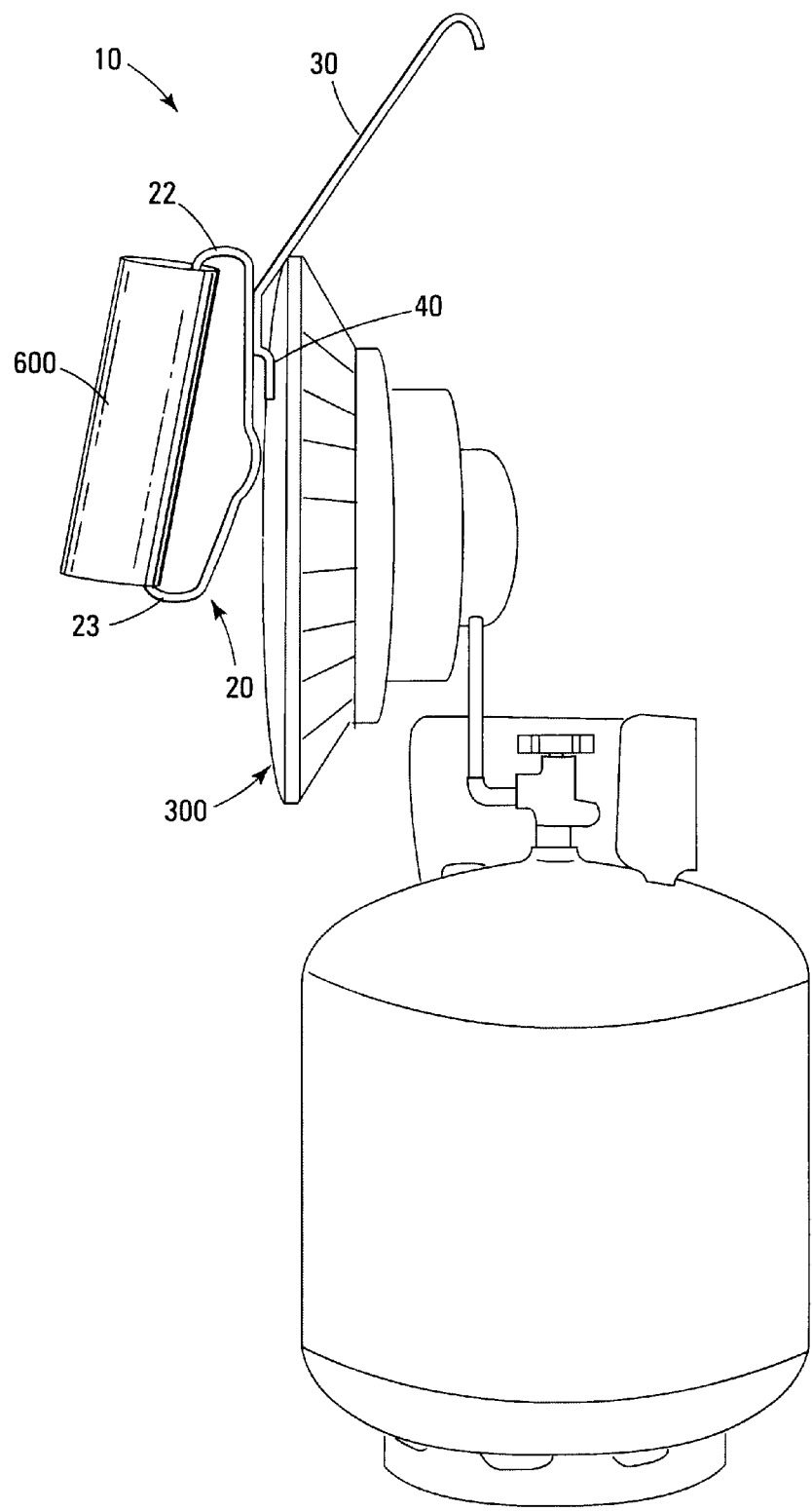
FIG. 4 is a side view of the invention in FIG. 2 positioned proximate a source of heat and suspended from a structural element via the hook.
Figure 5:
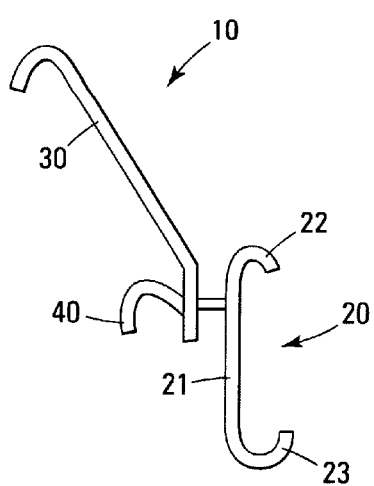
FIG. 5 is a side view of one embodiment of the invention.
Figure 6:
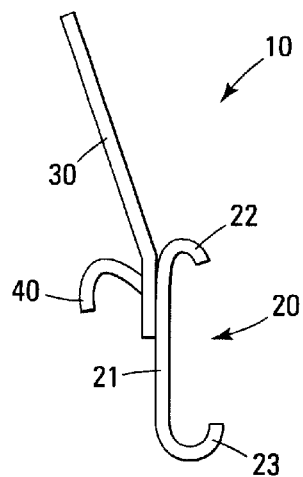
FIG. 6 is a side view of one embodiment of the invention.

A liquid 200 may then be placed within the vessel 600. The type of liquid 200 placed in the vessel 600 depends on the use of the liquid 200. The liquid 200 may then be heated. The liquid 200 may be heated by positioning the liquid 200 containing vessel 600 within the clip 20 proximate a source of heat 300. This may be done by manually holding the handle 30 such that the vessel 600 is proximate the source of heat 300 or by suspending the tool 10 from a structural element (not numbered) via the hook 40. In the preferred embodiment, as shown in FIG. 4, the liquid 200 may be heated by suspending the tool 10 from a propane heater (not numbered).

The heated liquid 200 may then be poured into an ice-fishing hole (not shown) in order to keep the hole (not shown) open. The heated liquid 200 may also be used to prepare food 500 or heated beverages (not numbered).

In a second embodiment an open metal food container 400 containing a food 500 is inserted into the clip 20 of the tool 10. To insert the metal food container 400 the user (not shown) engages the top edge (not numbered) of the metal food container 400 with the first connection member 22. The bottom edge (not numbered) of the metal food container 400 engages the second connection member 23. Engagement of both ends (not numbered) of the vessel 600 should maintain the vessel 600 within the clip 20.

The food 500 may then be heated. The food 500 may be heated by positioning the food 500 containing metal food container 400 within the clip 20 proximate a source of heat 300. This may be done by manually holding the handle 30 such that the metal food container 400 is proximate the source of heat 300 or by suspending the tool 10 from a structural element (not numbered) via the hook 40. In the preferred embodiment, as shown in FIG. 4, the food 500 may be heated by suspending the tool 10 from a propane heater (not numbered). The tool 10, as shown in FIG. 3, allows the insertion of metal food containers 400 of varying size to be inserted in the clip 20 by allowing the longitudinal space (not numbered) between the first connection member 22 and the second connection member 23 to be varied.

In a third embodiment of the invention a liquid 200 may be placed within the container 150 of the tool 110. The type of liquid 200 placed in the container 150 depends on the use of the liquid 200. The liquid 200 may then be heated. The liquid 200 may be heated by positioning the liquid 200 containing container 150 proximate a source of heat 300. This may be done by manually holding the handle 130 such that the container 150 is proximate the source of heat 300 or by suspending the tool 110 from a structural element (not numbered) via the hook 140.

The heated liquid 200 may then be poured into an ice-fishing hole (not shown) in order to keep the hole (not shown) open. The heated liquid 200 may also be used to prepare food 500 or heated beverages (not numbered).

I claim:

1. A method, comprising the steps of:
   (a) obtaining a tool including at least an interconnected combination of at least:
      (1) a clip, including at least:
         (A) a longitudinally extending central section,
         (B) a first connection member extending in a first transverse direction from the central section, and
         (C) a second connection member longitudinally spaced from the first connection member and extending in the first transverse direction from the central section,
      (2) a handle longitudinally extending relative to the clip in a first longitudinal direction, and
      (3) a hook extending in a second transverse direction and a second longitudinal direction relative to the clip and longitudinally positioned intermediate the first connection member and the second connection member;
   (b) inserting a vessel capable of holding a liquid within the clip;
   (c) placing a liquid within the vessel; and
   (d) heating the liquid.

2. The method of claim 1 further comprising the step of positioning the liquid containing vessel inserted within the clip proximate a source of heat by suspending the tool from a structural element via the hook.

3. The method of claim 1 further comprising the step of pouring the heated liquid into an ice-fishing hole in order to keep the hole open.

4. The method of claim 1 wherein the longitudinally extending central section contains a leaf spring intermediate the first connection member and the second connection member.

5. A method, comprising the steps of:
   (a) obtaining a tool including at least an interconnected combination of at least:
      (1) a clip, including at least:
         (A) a longitudinally extending central section,
         (B) a first connection member extending in a first transverse direction from the central section, and
         (C) a second connection member longitudinally spaced from the first connection member and extending in the first transverse direction from the central section,
      (2) a handle longitudinally extending relative to the clip in a first longitudinal direction, and
      (3) a hook extending in a second transverse direction and a second longitudinal direction relative to the clip and longitudinally positioned intermediate the first connection member and the second connection member;
   (b) inserting an open metal food container within the clip wherein the metal food container contains a food; and
   (d) heating the food.

6. The method of claim 5 further comprising the step of positioning the food containing container inserted within the clip proximate a source of heat by suspending the tool from a structural element via the hook.

7. The method of claim 5 wherein the longitudinally extending central section contains a leaf spring intermediate the first connection member and the second connection member.

* * * * *